United States Patent Office 3,586,641

Patented June 22, 1971

3,586,641

ENHANCEMENT OF SUPERCONDUCTIVITY OF LANTHANUM AND YTTRIUM SESQUICARBIDE

Milton C. Krupka, Angelo L. Giorgi, Nerses H. Krikorian, and Eugene G. Szklarz, Los Alamos, N. Mex., assignors to the United States of America as represented by the United States Atomic Energy Commission No Drawing. Filed July 18, 1969, Ser. No. 843,224

Int. Cl. C01b *31/30;* H01b *1/00;* H01v *11/12*

U.S. Cl. 252—516 3 Claims

ABSTRACT OF THE DISCLOSURE

A method of enhancing the superconductivity of body-centered cubic lanthanum and yttrium sesquicarbide through formation of the sesquicarbides from ternary alloys of novel composition $(N_xM_{1-x})C_z$, where N is yttrium or lanthanum, M is thorium, any of the Group IV and VI transition metals, or gold, germanium or silicon, and $z$ is approximately 1.2 to 1.6. These ternary sesquicarbides have superconducting transition temperatures as high as 17.0° K.

The invention described herein was made in the course of, or under, a contract with the U.S. Atomic Energy Commission.

This invention relates to the field of superconductors.

In U.S. patent application Ser. No. 707,476 (filed Feb. 23, 1968, now Pat. No. 3,482,940) the present inventors disclose a method of preparing stable body-centered cubic yttrium sesquicarbide by arc-melting yttrium carbide and then subjecting it to a pressure of about 20 kilobars, a temperature of about 1300° C. for a period of about 5 minutes, and temperature quenching to ambient temperature while retaining the elevated pressure. They also disclose in that application that the sesquicarbide thus prepared becomes superconducting at a temperature of about 8° K., with the transition temperature ranging from 7.5 to 10.5° K. depending on the precise chemical composition of the compound. Further work has now extended the transition temperature to the range from 6.0 to 11.5° K. Prior to this disclosure the body-centered cubic structure denoted as $D5_c$, which is the structure of this sesquicarbide, had not been demonstrated to be a superconductor for any combination of elements.

The inventors have now discovered that the addition of small amounts of certain other metals to form a ternary sesquicarbide produced by the method disclosed in U.S. patent application Ser. No. 707,476 will significantly raise the transition temperatures for both lanthanum and yttrium sesquicarbide.

The greatest increases occur, however, in the body-centered cubic yttrium sesquicarbide. An yttrium-thorium sesquicarbide produced by the method of U.S. patent application Ser. No. 707,476 has been found to have a superconducting transition temperature of 17° K. Heretofore, superconducting transition temperatures greater than 15° K. were associated with only two other cubic systems, i.e., those having the $\beta$-W cubic (A-15) and the NaCl cubic (B-1) structure.

An object of this invention is therefore to provide a novel method of enhancing the superconductivity of body-centered cubic yttrium sesquicarbide.

Other objects and advantages of this invention will be apparent from the following description of the preferred embodiment.

Arc-melted ternary alloys of yttrium-thorium carbide having the nominal composition $(Y_xTh_{1-x})C_z$ were prepared and subjected to pressures of 15–25 kilobars and temperatures of 1200–1400° C. for periods of 4–6 minutes and then temperature quenched to ambient temperature at these elevated pressures to form the stable body-centered cubic yttrium-thorium sesquicarbide.

Representative values of $x$ and $z$ are shown in Table I. The data clearly indicate that for nominal compositions of yttrium-thorium sesquicarbide in which $x$ is in the range of 0.9–0.25 and $z$ is in the range of 1.2 to 1.55, the addition of thorium significantly increases the superconducting transition temperature. The maximum transition temperature, 17° K., is found with the composition $(Y_{.7}Th_{.3})C_{1.55}$. The highest transition temperature values are found for the nominal compositions of $$(Y_{.60-.75}Th_{.40-.25})C_{1.35-1.55}$$

The inventors have found that certain other elements, when substituted for thorium with yttrium sesquicarbide, will also raise the superconducting transition temperature. Table II shows the effect of a number of other additives. Data for body-centered cubic yttrium sesquicarbide are listed for comparison purposes. Additions of the Group IV and VI transition metals, gold, germanium and silicon all increase the superconducting transition temperature.

What we claim is:

TABLE I.—SUPERCONDUCTING TRANSITION TEMPERATURES AND LATTICE PARAMETERS OF YTTRIUM-THORIUM SESQUICARBIDE

| Nominal composition (arc-melt) | Superconducting transition temp., Tc,° K. | Estimated yield, percent | Lattice parameter of $(Y, Th)_2C_3$, A. |
|---|---|---|---|
| $(Y_9Th_1)C_{1.35}$ | 12.0 | >95 | 8.2719±4. |
| $(Y_8Th_2)C_{1.35}$ | 14.7 | >90 | 8.302±1. |
| $(Y_7Th_3)C_{1.35}$ | 16.4 | >80 | 8.334±1. |
| $(Y_{65}Th_{35})C_{1.35}$ | 16.8 | >80 | 8.376±7. |
| $(Y_6Th_4)C_{1.35}$ | 16.0 | >80 | 8.394±4. |
| $(Y_5Th_5)C_{1.35}$ | 15.5 | ~40–50 | Lines very strained—pattern not readable (8.425 est.). |
| $(Y_4Th_6)C_{1.35}$ | 15.1 | ~40 | 8.455±3. |
| $(Y_3Th_7)C_{1.35}$ | 14.4 | ~50 | 8.494±7. |
| $(Y_2Th_8)C_{1.35}$ | [1] <4 | 0 | bcc cell not formed. |
| $(Y_1Th_9)C_{1.35}$ | <4 | 0 | Do. |
| $(Y_7Th_3)C_{1.20}$ | 15.4 | ~40 | 8.306±4. |
| $(Y_3Th_7)C_{1.25}$ | 14.6 | ~40 | 8.473±3. |
| $(Y_7Th_3)C_{1.40}$ | 16.3 | >90 | 8.3552±10. |
| $(Y_7Th_3)C_{1.45}$ | 16.3 | >80 | 8.3640±6. |
| $(Y_6Th_4)C_{1.45}$ | 15.8 | >60 | 8.383±2. |
| $(Y_3Th_7)C_{1.45}$ | 14.6 | ~30 | 8.481±5. |
| $(Y_{75}Th_{25})C_{1.50}$ | 16.7 | >70 | 8.340±2. |
| $(Y_7Th_3)C_{1.50}$ | 16.8 | >80 | 8.364±3. |
| $(Y_7Th_3)C_{1.55}$ | 17.0 | >60 | 8.362±7. |
| $(Y_3Th_7)C_{1.55}$ | <4 | 0 | bcc cell not formed. |
| $(Y_7Th_3)C_{1.65}$ | [2] 16.3 | <10 | Weak phase of $(Y, Th)_2C_3$—pattern not readable. |
| $(Y_6Th_4)C_{1.65}$ | <4 | 0 | bcc cell not formed. |

[1] Does not superconduct down to 4° K. which is the limit of measurement.

[2] Very weak signal indicating small portion of material is superconducting.

TABLE II.—SUPERCONDUCTING TRANSITION TEMPERATURES AND LATTICE PARAMETERS OF YTTRIUM-METAL SESQUICARBIDE

| Nominal composition | Superconducting transition temp., $T_c$,° K. | Lattice parameter of $(YM)_2C_3$ after high pressure, A. |
|---|---|---|
| $YC_{1.30}$ (reference) | 8.2 | 8.2386±4. |
| $(Y_9Au_1)C_{1.30}$ | 10.1 | 8.2503±6. |
| $YC_{1.35}$ (reference) | 10.0 | 8.2283±3. |
| $(Y_9Ge_1)C_{1.35}$ | 10.6 | 8.286±5. |
| $(Y_{85}Ge_{15})C_{1.35}$ | (1) | bcc structure barely formed. |
| $(Y_9Si_1)C_{1.35}$ | 11.3 | 8.272±2. |
| $(Y_9Sn_1)C_{1.35}$ | 10.2 | 8.2431±7. |
| $(Y_9Pb_1)C_{1.35}$ | (1) | bcc structure barely formed. |
| $(Y_9Ru_1)C_{1.35}$ | 11.2 | 8.2408±6. |
| $(Y_7Ru_3)C_{1.35}$ | [2]<4 | bcc structure not formed. |
| $(Y_7Re_3)C_{1.35}$ | <4 | Do. |
| $(Y_{85}In_{15})C_{1.35}$ | <4 | Do. |
| $(Y_8Zn_2)C_{1.35}$ | <4 | Do. |
| $(Y_9Nb_1)C_{1.35}$ | 10.8 | 8.2389±4. |
| $(Y_9Ti_1)C_{1.35}$ | 10.7 | 8.2300±5. |
| $(Y_9Ca_1)C_{1.35}$ | 10.5–11.5 | Inhomogeneous sample. |
| $YC_{1.45}$ (reference) | 11.5 | 8.2378±6. |
| $(Y_9Ti_1)C_{1.45}$ | 14.2 | 8.2363±6. |
| $(Y_9Zr_1)C_{1.45}$ | 13.0 | 8.2360±9. |
| $(Y_9Mo_1)C_{1.45}$ | 13.8 | 8.239±1. |
| $(Y_9W_1)C_{1.45}$ | 14.5 | 8.242±2. |
| $(Y_9Bi_1)C_{1.45}$ | 9.35 | 8.2396±4. |
| $(Y_7Bi_3)C_{1.45}$ | <4 | bcc structure not formed. |
| $(Y_{85}U_{15})C_{1.45}$ | <4 | 8.217±3. |
| $(Y_9V_1)C_{1.45}$ | 11.5 | 8.240±2. |
| $(Y_9Cr_1)C_{1.45}$ | 12.4 | 8.2384±10. |
| $YC_{1.50}$ (reference) | [3]6.0 8.0 | Reference not available. |
| $(Y_7Ti_3)C_{1.50}$ | 12.9 | 8.237±5. |
| $YC_{1.55}$ (reference) | 6.0 | 8.2467±5. |
| $(Y_9Ti_1)C_{1.55}$ | 14.5 | 8.2382±7. |
| $(Y_9W_1)C_{1.55}$ | 14.8 | 8.240±2. |

[1] Very weak signal.

[2] Does not superconduct down to 4° K. which is the limit of measurement.

[3] Estimated.

1. A method of enhancing or raising the temperature at which body-centered cubic lanthanum and yttrium sesquicarbides become superconducting, in which the sesquicarbides are produced from arc-melted ternary alloys of nominal composition $(N_xM_{1-x})C_z$ where N is lanthanum or yttrium; M is thorium, any of the Group IV and VI transition metals, or gold, germanium or silicon; $x$ is in the range of 0.9–0.25; and $z$ is in the range of 1.2 to 1.55 and wherein the melted material is subjected to pressures in the range of 15–25 kilobars, temperatures of 1200–1400° C. for a period of 4–6 minutes, and then temperature quenched at the elevated pressures.

2. The method of claim 1 where M is thorium.

3. The method of claim 1 where N is yttrium, M is thorium, $x$ is 0.7 and $z$ is 1.55.

References Cited

UNITED STATES PATENTS 3,311,554 3/1967 McCurdy et al. ----- 23—208X

OTHER REFERENCES

Spedding et al., "The Crystal Structures of some of the Rare Earth Carbides," J. Am. Chem. Soc., 80, pp. 4499–4503 (1958).

JOHN T. GOOLKASIAN, Primary Examiner

J. C. GIL, Assistant Examiner

U.S. Cl. X.R.

23—208A; 252—520, 521